United States Patent
Hasegawa et al.

(10) Patent No.: US 10,633,720 B2
(45) Date of Patent: Apr. 28, 2020

(54) HIGH-STRENGTH GALVANIZED STEEL SHEET AND METHOD FOR MANUFACTURING THE SAME

(71) Applicant: JFE STEEL CORPORATION, Tokyo (JP)

(72) Inventors: Hiroshi Hasegawa, Fukuyama (JP); Yoshimasa Funakawa, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 242 days.

(21) Appl. No.: 15/550,159

(22) PCT Filed: Jan. 21, 2016

(86) PCT No.: PCT/JP2016/000303
§ 371 (c)(1),
(2) Date: Aug. 10, 2017

(87) PCT Pub. No.: WO2016/129213
PCT Pub. Date: Aug. 18, 2016

(65) Prior Publication Data
US 2018/0030565 A1    Feb. 1, 2018

(30) Foreign Application Priority Data

Feb. 13, 2015 (JP) ................. 2015-026123

(51) Int. Cl.
*C21D 9/46* (2006.01)
*C21D 6/00* (2006.01)
(Continued)

(52) U.S. Cl.
CPC .............. *C21D 9/46* (2013.01); *B32B 15/013* (2013.01); *B32B 15/04* (2013.01); *B32B 15/043* (2013.01); *B32B 15/18* (2013.01); *C21D 6/005* (2013.01); *C21D 6/008* (2013.01); *C21D 8/02* (2013.01); *C21D 8/0205* (2013.01); *C21D 8/0226* (2013.01); *C21D 8/0236* (2013.01); *C21D 8/0247* (2013.01); *C21D 8/0278* (2013.01); *C22C 38/001* (2013.01); *C22C 38/002* (2013.01); *C22C 38/005* (2013.01); *C22C 38/02* (2013.01); *C22C 38/04* (2013.01);
(Continued)

(58) Field of Classification Search
CPC .. C21D 6/008; C21D 6/005; C21D 2211/008; C21D 2211/005; C21D 2211/002; C21D 8/02; C21D 8/0278; C21D 8/0236; C21D 8/0226; C21D 8/0205; C21D 9/46; C21D 8/0247; C22C 38/22; C22C 38/14; C22C 38/58; C22C 38/26; C22C 38/16; C22C 38/12; C22C 38/08; C22C 38/06; C22C 38/04; C22C 38/02; C22C 38/005; C22C 38/002; C22C 38/001; C22C 38/38; C22C 38/32; C22C 38/28; C22C 38/18; C22C 38/20; C22C 38/24; C22C 38/40; C22C 38/42; C22C 38/44; C22C 38/46; C22C 38/50; C22C 38/54; C23C 2/06; C23C 2/28; C23C 2/40; C23C 2/02; C23C 2/00; C23C 2/34; C23C 2/36; C23C 30/00; C23C 30/005; Y10T 428/12951; Y10T 428/12958; Y10T 428/12799; Y10T 428/12979; Y10T 428/12972; B32B 15/013; B32B 15/04; B32B 15/043; B32B 15/18
See application file for complete search history.

(56) References Cited

U.S. PATENT DOCUMENTS

2011/0240176 A1* 10/2011 Kaneko .................... C23C 2/28
                                                                  148/503
2013/0071687 A1   3/2013 Takagi et al.
(Continued)

FOREIGN PATENT DOCUMENTS

CN     102227511 A    10/2011
EP       2233597 A1    9/2010
(Continued)

OTHER PUBLICATIONS

Chinese Office Action for Chinese Application No. 2016800095047, dated Jun. 5, 2018, with Concise Statement of Search Report, 8 pages.
(Continued)

*Primary Examiner* — Michael E. La Villa
(74) *Attorney, Agent, or Firm* — RatnerPrestia

(57) ABSTRACT

A high-strength galvanized steel sheet having a chemical composition containing, by mass %, C: 0.07% to 0.25%, Si: 0.01% to 3.00%, Mn: 1.5% to 4.0%, P: 0.100% or less, S: 0.02% or less, Al: 0.01% to 1.50%, N: 0.001% to 0.008%, Ti: 0.003% to 0.200%, B: 0.0003% to 0.0050%, and the balance being Fe and inevitable impurities, in which the relationship Ti>4N is satisfied, and a microstructure including, in terms of area ratio in a cross section located at ¼ of the thickness from the surface of a base steel sheet, a ferrite phase in an amount of 70% or less (including 0%), a bainite phase in an amount of 20% or less (including 0%), a martensite phase in an amount of 25% or more, and a retained austenite phase in an amount of less than 3% (including 0%), in which the average crystal grain diameter of the martensite phase is 20 μm or less, and in which a variation in the Vickers hardness of the martensite phase is 20 or less in terms of standard deviation, as well as a method for manufacturing the steel sheet, is disclosed.

6 Claims, No Drawings

(51) Int. Cl.
| | |
|---|---|
| C21D 8/02 | (2006.01) |
| C23C 2/06 | (2006.01) |
| C23C 2/28 | (2006.01) |
| C23C 2/40 | (2006.01) |
| C22C 38/38 | (2006.01) |
| C22C 38/32 | (2006.01) |
| C22C 38/28 | (2006.01) |
| C22C 38/26 | (2006.01) |
| C22C 38/22 | (2006.01) |
| C22C 38/16 | (2006.01) |
| C22C 38/14 | (2006.01) |
| C22C 38/12 | (2006.01) |
| C22C 38/08 | (2006.01) |
| C22C 38/06 | (2006.01) |
| C22C 38/04 | (2006.01) |
| C22C 38/02 | (2006.01) |
| C22C 38/00 | (2006.01) |
| C22C 38/58 | (2006.01) |
| C23C 2/02 | (2006.01) |
| C22C 38/44 | (2006.01) |
| C22C 38/40 | (2006.01) |
| C22C 38/50 | (2006.01) |
| C22C 38/42 | (2006.01) |
| C22C 38/54 | (2006.01) |
| C22C 38/20 | (2006.01) |
| C22C 38/46 | (2006.01) |
| C22C 38/24 | (2006.01) |
| C22C 38/18 | (2006.01) |
| C23C 2/00 | (2006.01) |
| C23C 2/36 | (2006.01) |
| C23C 30/00 | (2006.01) |
| C23C 2/34 | (2006.01) |
| B32B 15/04 | (2006.01) |
| B32B 15/18 | (2006.01) |
| B32B 15/01 | (2006.01) |

(52) U.S. Cl.
CPC .............. *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/40* (2013.01); *C22C 38/42* (2013.01); *C22C 38/44* (2013.01); *C22C 38/46* (2013.01); *C22C 38/50* (2013.01); *C22C 38/54* (2013.01); *C22C 38/58* (2013.01); *C23C 2/00* (2013.01); *C23C 2/02* (2013.01); *C23C 2/06* (2013.01); *C23C 2/28* (2013.01); *C23C 2/34* (2013.01); *C23C 2/36* (2013.01); *C23C 2/40* (2013.01); *C23C 30/00* (2013.01); *C23C 30/005* (2013.01); *C21D 2211/002* (2013.01); *C21D 2211/005* (2013.01); *C21D 2211/008* (2013.01); *Y10T 428/12799* (2015.01); *Y10T 428/12951* (2015.01); *Y10T 428/12958* (2015.01); *Y10T 428/12972* (2015.01); *Y10T 428/12979* (2015.01)

(56) References Cited

U.S. PATENT DOCUMENTS

| | | |
|---|---|---|
| 2013/0206288 A1 | 8/2013 | Kaneko et al. |
| 2017/0044640 A1 | 2/2017 | Kimura et al. |
| 2018/0023154 A1* | 1/2018 | Hasegawa ................ C21D 8/02 148/530 |

FOREIGN PATENT DOCUMENTS

| | | |
|---|---|---|
| EP | 2243852 A1 | 10/2010 |
| EP | 2371979 A1 | 10/2011 |
| EP | 2757171 A1 | 7/2014 |
| EP | 2762589 A1 | 8/2014 |
| EP | 2765212 A1 | 8/2014 |
| EP | 2998416 A1 | 3/2016 |
| JP | 2009209384 A | 9/2009 |
| JP | 2010070843 A | 4/2010 |
| JP | 2010215958 A | 9/2010 |
| JP | 2011111670 A | 6/2011 |
| JP | 2011153361 A | 8/2011 |
| JP | 2012012703 A | 1/2012 |
| WO | 2011129452 A1 | 10/2011 |
| WO | 2015015739 A1 | 2/2015 |
| WO | 2015162849 A1 | 4/2017 |

OTHER PUBLICATIONS

Extended European Search Report for European Application No. 16748861.8, dated Nov. 15, 2017, 7 pages.

International Search Report and Written Opinion for International Application No. PCT/JP2016/000303, dated Apr. 19, 2016—6 Pages.

* cited by examiner

HIGH-STRENGTH GALVANIZED STEEL SHEET AND METHOD FOR MANUFACTURING THE SAME

CROSS REFERENCE TO RELATED APPLICATIONS

This is the U.S. National Phase Application of PCT/International Application No. PCT/JP2016/000303, filed Jan. 21, 2016 and claims priority to Japanese Patent Application No. 2015-026123, filed Feb. 13, 2015, the disclosures of both applications being incorporated herein by reference in their entireties for all purposes.

FIELD OF THE INVENTION

The present invention relates to a high-strength galvanized steel sheet and a method for manufacturing the steel sheet.

BACKGROUND OF THE INVENTION

In order to reduce $CO_2$ emission from the viewpoint of global environment conservation, improving the fuel efficiency of an automobile by reducing the weight of the automobile body while maintaining the strength of the automobile body continues to be an important issue in the automobile industry. In order to reduce the weight of an automobile body while maintaining the strength of the automobile body, reducing the thickness of a steel sheet by increasing the strength of the steel sheet which is used as a material for automobile parts is effective. Here, many automobile parts which are made from a steel sheet are formed by using, for example, a press forming method or a burring forming method. Therefore, a galvanized steel sheet which is used as a material for automobile parts is required to have not only a desired strength but also excellent formability.

Nowadays, there is a growing trend toward using a high-strength galvanized steel sheet as a material for the skeleton of an automobile body. When a high-strength galvanized steel sheet is formed, since work which mainly involves bending is performed in many cases, excellent bending workability is required. Against such a background, various high-strength galvanized steel sheets excellent in terms of bending workability are being developed. Patent Literature 1 and Patent Literature 2 disclose techniques regarding high-strength galvanized steel sheets excellent in terms of bending workability from the viewpoint of cracking.

PATENT LITERATURE

PTL 1: Japanese Unexamined Patent Application Publication No. 2012-12703
PTL 2: Japanese Unexamined Patent Application Publication No. 2010-70843

SUMMARY OF THE INVENTION

However, in the case of the techniques according to Patent Literature 1 and Patent Literature 2, since bending workability is simply increased only from the viewpoint of cracking, no consideration is given to, for example, appearance quality such as shapes and wrinkles after forming has been performed. When a high-strength galvanized steel sheet is subjected to bending work, since streaky undulation appears on a bending ridge line due to, for example, the segregation of alloy chemical elements, there is a problem of a decrease in, for example, coating capability and appearance quality. Such a problem frequently occurs particularly in the case of a high-strength galvanized steel sheet containing alloy chemical elements in large amounts.

An issue to be solved by embodiments of the present invention is to provide a high-strength galvanized steel sheet excellent in terms of bending workability and a method for manufacturing the steel sheet.

The present inventors diligently conducted investigations from many viewpoints such as the chemical composition and microstructure of a steel sheet and a method for manufacturing the steel sheet, and, as a result, found the following facts.

That is, it is possible to achieve a high strength and excellent bending workability at the same time by controlling the C content to be 0.07 mass % to 0.25 mass %, by appropriately controlling the contents of other alloy chemical elements, and by appropriately controlling the combination of the area ratio of each of phases in a steel sheet microstructure, the average crystal grain diameter of a martensite phase, a variation in the Vickers hardness of a martensite phase, and so forth. The subject matter of embodiments of the present invention is as follows.

[1] A high-strength galvanized steel sheet having a chemical composition containing, by mass %, C: 0.07% to 0.25%, Si: 0.01% to 3.00%, Mn: 1.5% to 4.0%, P: 0.100% or less, S: 0.02% or less, Al: 0.01% to 1.50%, N: 0.001% to 0.008%, Ti: 0.003% to 0.200%, B: 0.0003% to 0.0050%, and the balance being Fe and inevitable impurities, in which the relationship Ti>4N is satisfied, and a microstructure including, in terms of area ratio in a cross section located at ¼ of the thickness from the surface of a base steel sheet, a ferrite phase in an amount of 70% or less (including 0%), a bainite phase in an amount of 20% or less (including 0%), a martensite phase in an amount of 25% or more, and a retained austenite phase in an amount of less than 3% (including 0%), in which the average crystal grain diameter of the martensite phase is 20 µm or less, and in which a variation in the Vickers hardness of the martensite phase is 20 or less in terms of standard deviation.

[2] The high-strength galvanized steel sheet according to item [1], the chemical composition further containing, by mass %, at least one selected from Cr: 0.01% to 2.00%, Mo: 0.01% to 2.00%, V: 0.01% to 2.00%, Ni: 0.01% to 2.00%, and Cu: 0.01% to 2.00%.

[3] The high-strength galvanized steel sheet according to item [1] or [2], the chemical composition further containing, by mass %, Nb: 0.003% to 0.200%.

[4] The high-strength galvanized steel sheet according to any one of items [1] to [3], the chemical composition further containing, by mass %, at least one selected from Ca: 0.001% to 0.005% and REM: 0.001% to 0.005%.

[5] A method for manufacturing a high-strength galvanized steel sheet, the method including performing the following processes in the following order: a hot rolling process in which, after having performed finish rolling on a slab having the chemical composition according to any one of items [1] to [4], cooling is performed such that a total time during which the hot-rolled steel sheet is retained in a temperature range of 600° C. to 700° C. is 10 seconds or less and in which coiling is performed at a coiling temperature of lower than 600° C., a cold rolling process in which cold rolling is performed with a rolling reduction of more than 20%, an annealing process in which heating is performed to an annealing temperature of 750° C. to 950° C. at an average heating rate of 15° C./s or less and in which the heated steel sheet is held at the annealing temperature for 30 seconds or more, a first cooling process in which cooling is performed at an average cooling rate of 3° C./s or more, a galvanizing process in which galvanizing is performed, and a second cooling process in which, after having performed cooling to a temperature equal to or higher than the Ms temperature at an average cooling rate of 1° C./s or more, cooling is performed to a temperature of 100° C. or lower at an average cooling rate of 100° C./s or more.

[6] The method for manufacturing a high-strength galvanized steel sheet according to item [5], in which, after having performed galvanizing in the galvanizing process, an alloying treatment is further performed on the galvanizing layer by heating the galvanized steel sheet to a temperature of 460° C. to 600° C.

Here, in the present invention, the meaning of the term "a high-strength galvanized steel sheet" includes not only a galvanized steel sheet but also a galvannealed steel sheet which have a tensile strength (TS) of 980 MPa or more. In addition, in the case where it is necessary to distinguish between a galvanized steel sheet and a galvannealed steel sheet, these steel sheets shall be separately described.

According to embodiments of the present invention, it is possible to obtain a high-strength galvanized steel sheet excellent in terms of bending workability. It is possible to realize a satisfactory appearance quality after bending work has been performed on the high-strength galvanized steel sheet according to embodiments of the present invention. The high-strength galvanized steel sheet according to embodiments of the present invention can suitably be used as a material for automobile parts.

DETAILED DESCRIPTION OF THE INVENTION

Hereafter, the embodiments of the present invention will be described in detail. Here, "%" used when describing the contents of constituent chemical elements shall refer to "mass %", unless otherwise noted.

1) Chemical Composition

C: 0.07% to 0.25%

C is a chemical element which is necessary for increasing TS by forming a martensite phase. In the case where the C content is less than 0.07%, since the strength of a martensite phase is low, it is not possible to achieve a TS of 980 MPa or more. On the other hand, in the case where the C content is more than 0.25%, there is a decrease in bending workability. Therefore, the C content is set to be 0.07% to 0.25%. In order to achieve a TS of 1180 MPa or more, it is preferable that the C content be 0.08% or more, or more preferably 0.10% or more. On the other hand, it is preferable that the upper limit of the C content be 0.23% or less.

Si: 0.01% to 3.00%

Si is a chemical element which is effective for increasing TS through the solid solution strengthening of steel. In order to realize such an effect, it is necessary that the Si content be 0.01% or more. On the other hand, in the case where the Si content is increased, there is a decrease in bending workability due to the embrittlement of steel. In embodiments of the present invention, it is acceptable that the Si content be as high as 3.00%. Therefore, the Si content is set to be 0.01% to 3.00%, preferably 0.01% to 1.80%, more preferably 0.01% to 1.00%, or even more preferably 0.01% to 0.70%.

Mn: 1.5% to 4.0%

Mn is a chemical element which increases TS through the solid solution strengthening of steel and through the formation of a martensite phase by inhibiting ferrite transformation and bainite transformation. In order to sufficiently realize such an effect, it is necessary that the Mn content be 1.5% or more. On the other hand, in the case where the Mn content is more than 4.0%, there is a decrease in bending workability due to the embrittlement of steel. Therefore, the Mn content is set to be 1.5% to 4.0%. It is preferable that the lower limit of the Mn content be 1.8% or more. It is preferable that the upper limit of the Mn content be 3.8% or less, or more preferably 3.5% or less.

P: 0.100% or Less

Since P decreases bending workability through the embrittlement of steel due to grain boundary segregation, it is desirable that the P content be as small as possible. However, the P content is set to be 0.100% or less from the viewpoint of, for example, manufacturing cost. It is preferable that the P content be 0.050% or less, more preferably 0.025% or less, or even more preferably 0.015% or less. Although there is no particular limitation on the lower limit of the P content because there is no problem in principle even in the case where P is not contained at all, since there is a decrease in productivity in the case where the P content is less than 0.001%, it is preferable that the P content be 0.001% or more.

S: 0.02% or Less

Since S decreases bending workability as a result of existing in the form of inclusions such as MnS, it is desirable that the S content be as small as possible, and it is acceptable that the S content be as high as 0.02% in embodiments of the present invention. Therefore, the S content is set to be 0.02% or less. Although there is no particular limitation on the lower limit of the S content because there is no problem in principle even in the case where S is not contained at all, since there is a decrease in productivity in the case where the S content is less than 0.0005%, it is preferable that the S content be 0.0005% or more.

Al: 0.01% to 1.50%

Since Al is effective as a deoxidizing agent, it is preferable that Al be contained in a deoxidation process. In order to realize such an effect, it is necessary that the Al content be 0.01% or more. On the other hand, in the case where the Al content is more than 1.50%, since an excessive amount of ferrite phase is formed when annealing is performed, there is a decrease in TS. Therefore, the Al content is set to be 0.01% to 1.50%, preferably 0.01% to 0.70%, or more preferably 0.01% to 0.10%.

N: 0.001% to 0.008%

In the case where the N content is more than 0.008%, since there is coarsening of TiN, the formation of a ferrite phase is promoted because such TiN becomes the nucleation site of a ferrite phase, which makes it impossible to form the steel sheet microstructure according to embodiments of the present invention. On the other hand, in the case where the N content is less than 0.001%, since there is a decrease in the effect of inhibiting the crystal grain growth of a ferrite phase and a martensite phase due to refining of nitrides such as AlN and TiN, it is not possible to form the steel sheet microstructure according to embodiments of the present invention due to coarsening of the crystal grains of these phases. Therefore, the N content is set to be 0.001% to 0.008%.

Ti: 0.003% to 0.200%

Ti is a chemical element which is effective for refining crystal grains of a martensite phase in a final microstructure by inhibiting the recrystallization of a ferrite phase when annealing is performed. In addition, Ti is a chemical element which is effective for bringing about the effect of B by inhibiting the formation of BN as a result of fixing N. In order to realize such effects, it is necessary that the Ti content be 0.003% or more. On the other hand, in the case where the Ti content is more than 0.200%, since coarse carbonitrides (such as TiCN and TiC) are formed, there is a decrease in the amount of solid solute C in steel, and there is a decrease in TS. Therefore, the Ti content is set to be 0.003% to 0.200%. It is preferable that the lower limit of the Ti content be 0.010% or more. It is preferable that the upper limit of the Ti content be 0.080% or less, or more preferably 0.060% or less.

B: 0.0003% to 0.0050%

B is a chemical element which is effective for forming a martensite phase having a small variation in hardness by homogeneously inhibiting the nucleation of a ferrite phase and a bainite phase from grain boundaries. In order to sufficiently realize such an effect, it is necessary that the B content be 0.0003% or more. On the other hand, in the case where the B content is more than 0.0050%, since there is an increase in the amount of inclusions, there is a decrease in bendability. Therefore, the B content is set to be 0.0003% to 0.0050%. It is preferable that the lower limit of the B content be 0.0005% or more. It is preferable that the upper limit of the B content be 0.0035% or less, or more preferably 0.0020% or less.

Ti>4N

Ti is a chemical element which is effective for bringing about the effect of B by inhibiting the formation of BN as a result of fixing N. In order to fully realize such an effect, it is necessary that the content of Ti and N satisfy the relationship Ti>4N.

Although the remainder is Fe and inevitable impurities, one or more of the chemical elements described below may be appropriately added as needed. In addition, in embodiments of the present invention, impurity chemical elements such as Zr, Mg, La, Ce, Sn, and Sb may be contained in an amount of 0.002% or less in total.

At least one chemical element selected from Cr: 0.01% to 2.00%, Mo: 0.01% to 2.00%, V: 0.01% to 2.00%, Ni: 0.01% to 2.00%, and Cu: 0.01% to 2.00%

Cr, Mo, V, Ni, and Cu are chemical elements which are effective for increasing strength by forming low-temperature-transformation phases such as a martensite phase. In order to realize such an effect, it is preferable that the content of each of at least one selected from Cr, Mo, V, Ni, and Cu be 0.01% or more. On the other hand, in the case where the content of each of Cr, Mo, V, Ni, and Cu is more than 2.00%, since the effect of these chemical elements becomes saturated, there is an increase in cost. Therefore, in the case where these chemical elements are added, it is preferable that the content of each of Cr, Mo, V, Ni, and Cu be 0.01% to 2.00%. It is more preferable that the Cr content be 0.01% to 1.50%, that the Mo content be 0.01% to 0.80%, that the V content be 0.01% to 0.80%, that the Ni content be 0.01% to 1.50%, and that the Cu content be 0.01% to 0.50%.

Nb: 0.003% to 0.200%

Nb is a chemical element which is effective for refining the crystal grains of a martensite phase in the final microstructure by inhibiting the recrystallization of a ferrite phase when annealing is performed. In order to realize such an effect, it is preferable that the Nb content be 0.003% or more. On the other hand, in the case where the Nb content is more than 0.200%, since coarse carbonitrides (such as NbCN and NbC) are formed, there is a decrease in the amount of solid solute C in steel, which may result in a decrease in TS. Therefore, in the case where Nb is added, it is preferable that the Nb content be 0.003% to 0.200%, more preferably 0.005% to 0.080%, or even more preferably 0.005% to 0.060%.

At Least One Chemical Element Selected from Ca: 0.001% to 0.005% and REM: 0.001% to 0.005%

Ca and REM are both chemical elements which are effective for increasing bending workability by controlling the shape of sulfides. In order to realize such an effect, it is preferable that the content of each of at least one selected from Ca and REM be 0.001% or more. On the other hand, in the case where the content of each of Ca and REM is more than 0.005%, since there is an increase in the amount of inclusions, there may be a decrease in bending workability. Therefore, in the case where these chemical elements are added, it is preferable that the content of each of Ca and REM be 0.001° to 0.005%.

2) Steel Sheet Microstructure

Area Ratio of Ferrite Phase: 70% or Less (Including 0%)

In the case where the area ratio of a ferrite phase is more than 70%, it is difficult to achieve a TS of 980 MPa or more and satisfactory bending workability at the same time. Therefore, the area ratio of a ferrite phase is set to be 70% or less. In order to achieve a TS of 1180 MPa or more, it is preferable that the area ratio of a ferrite phase be 60% or less, more preferably 20% or less, or even more preferably 8% or less.

Area Ratio of Bainite Phase: 20% or Less (Including 0%)

In the case where the area ratio of a bainite phase is more than 20%, there is a decrease in bending workability. Therefore, the area ratio of a bainite phase is set to be 20% or less. Here, in embodiments of the present invention, a bainite phase consists of an upper bainite phase and a lower bainite phase. In particular, it is preferable that the area ratio of a lower bainite phase be 1% or less from the viewpoint of bending workability (in particular, appearance quality).

Area Ratio of Martensite Phase: 25% or More

In the case where the area ratio of a martensite phase is less than 25%, it is difficult to achieve a TS of 980 MPa or more and satisfactory bending workability at the same time. Therefore, the area ratio of a martensite phase is set to be 25% or more. In order to achieve a TS of 1180 MPa or more, it is preferable that the area ratio of a martensite phase be 40% or more, more preferably 80% or more, or even more preferably 90% or more. Here, in the present invention, the term "a martensite phase" means a martensite phase which does not include carbides, and does not include a martensite phase including carbides such as an auto-tempered martensite phase or a tempered martensite phase.

Area Ratio of Retained Austenite Phase: Less than 3% (Including 0%)

A retained austenite phase decreases bending workability by transforming into a hard martensite phase when bending work is performed. Therefore, the area ratio of a retained austenite phase is set to be less than 3%, preferably less than 2%, or more preferably less than 1%.

Here, the volume fraction of a retained austenite phase is determined by using the method described below. Then, the value of the volume fraction is treated as the value of an area ratio.

Average Crystal Grain Diameter of Martensite Phase: 20 µm or Less

In the case where the average crystal grain diameter of a martensite phase is more than 20 µm, there is a decrease in bending workability. Therefore, the average crystal grain diameter of a martensite phase is set to be 20 µm or less, or preferably 15 µm or less.

Standard Deviation of Variation in Vickers Hardness of Martensite Phase: 20 or Less In the case where the standard deviation of a variation in the Vickers hardness of a martensite phase is more than 20, there is a decrease in bending workability (in particular, appearance quality). Therefore, the standard deviation of a variation in the Vickers hardness of a martensite phase is set to be 20 or less, or preferably 15 or less.

Here, in embodiments of the present invention, it is preferable that the Vickers hardness of a martensite phase be 300 to 600.

The steel sheet microstructure according to embodiments of the present invention may be a martensite single phase. On the other hand, there is a case where the steel sheet microstructure according to embodiments of the present invention includes, for example, a martensite phase and a pearlite phase which include the carbides described above as additional phases other than a ferrite phase, a martensite phase, a bainite phase, and a retained austenite phase. However, in embodiments of the present invention, it is preferable that the total area ratio of the additional phases be less than 10%, or more preferably less than 5%.

Here, the term "the area ratio" of, for example, a ferrite phase, a martensite phase, or a bainite phase in a steel sheet microstructure refers to the ratio of the area of each phase to an observed area in microstructure observation. It is possible to determine the area ratio of each of the phases by taking a sample from a base steel sheet free from a galvanizing layer (galvannealing layer in the case where alloying has been performed), by polishing a cross section in the thickness direction parallel to the rolling direction, by etching the polished cross section by using a 3%-nital solution, by taking the photographs of 3 fields of view located at ¼ of the thickness from the surface of the base steel sheet by using a SEM (scanning electron microscope) at a magnification of 1500 times, by determining the area ratio of each phase from the obtained image data by using image analysis software (for example, Image-Pro manufactured by Media Cybernetics, Inc.), and by defining the average area ratio of the 3 fields of view as the area ratio of each phase. In the image data described above, a ferrite phase is characterized by a black region, a martensite phase is characterized by a white region which does not include any carbide, a tempered martensite phase and an auto-tempered martensite phase are characterized by a light gray region which includes carbides having random orientations, a lower bainite phase is characterized by a light gray region which includes carbides having a homogeneous orientation, an upper bainite phase is characterized by a black region which includes carbides or an island-type white microstructure, and a pearlite phase is characterized by a black and white layered microstructure. However, since it is difficult to distinguish between a martensite phase and a retained austenite phase by using image data, the area ratio of a martensite phase is defined as a value obtained by subtracting the value of the volume fraction of a retained austenite phase, which has been determined by using an X-ray diffraction method described below, from the area ratio of a white microstructure.

The average crystal grain diameter of a martensite phase is determined by using the image data from which the area ratio has been determined, by dividing the total area of a martensite phase in the 3 fields of view described above by the number of grains of martensite phase in order to obtain an average area, and by defining the average area raised to the power of ½ as the average crystal grain diameter. Here, in the case where a retained austenite phase is included, the average crystal grain diameter is calculated by regarding both a martensite phase and a retained austenite phase as a martensite phase without distinguishing between the two phases.

The volume fraction of a retained austenite phase in a cross section located at ¼ of the thickness from the surface of a base steel sheet is determined by using the following method. That is, in a surface exposed by grinding the surface of a base steel sheet in the thickness direction to a position located at ¼ of the thickness and by further performing chemical polishing on the ground surface in order to remove 0.1 mm in the thickness direction, the integrated reflection intensities of the (200) plane, (220) plane, and (311) plane of fcc iron (austenite) and the (200) plane, (211) plane, and (220) plane of bcc iron (ferrite) are determined by using the Kα ray of Mo with an X-ray diffractometer. Then, the volume fraction of a retained austenite phase is defined as a volume fraction obtained from the ratio of the integrated reflection intensities of the relevant planes of fcc iron (austenite) to the integrated reflection intensities of the relevant planes of bcc iron (ferrite).

The Vickers hardness of a martensite phase is determined by using the following method. By taking a test piece having a cross section parallel to the rolling direction, a width of 10 mm, and a length (in the rolling direction) of 15 mm, and by selecting martensite phase grains at random at a position located at ¼ of the thickness from the surface of the base steel sheet in the cross section, the determination of Vickers hardness is performed on the selected grains. The determination is performed at 20 points with a load of 20 g.

Subsequently, by using the values of Vickers hardness determined at 18 points other than the maximum and minimum values of the determined Vickers hardness, a standard deviation σ is calculated by the equation described in [Math. 1] below.

$$\sigma = \sqrt{\frac{\sum (x - \bar{x})^2}{(n-1)}},$$ [Math. 1]

where σ: standard deviation, n: number of determination points (18 in the present invention), x: individual determined Vickers hardness, and $\bar{x}$: average Vickers hardness.

3) Manufacturing Conditions

It is possible to manufacture the high-strength galvanized steel sheet according to embodiments of the present invention by using, for example, a method for manufacturing a high-strength galvanized steel sheet including performing the following processes in the following order: a hot rolling process in which, after having performed finish rolling on a slab having the chemical composition described above, cooling is performed so that a total time during which the hot-rolled steel sheet is retained in a temperature range of 600° C. to 700° C. is 10 seconds or less and in which coiling is performed at a coiling temperature of lower than 600° C., a cold rolling process in which cold rolling is performed with a rolling reduction of more than 20%, an annealing process in which heating is performed to an annealing temperature of 750° C. to 950° C. at an average heating rate of 15° C./s or less and in which the heated steel sheet is held at the annealing temperature for 30 seconds or more, a first cooling process in which cooling is performed at an average cooling rate of 3° C./s or more, a galvanizing process in which galvanizing is performed, and a second cooling process in which, after having performed cooling to a temperature equal to or higher than the Ms temperature at an average cooling rate of 1° C./s or more, cooling is performed to a temperature of 100° C. or lower at an average cooling rate of 100° C./s or more. Here, an alloying treatment may be performed on a galvanizing layer as needed. In the hot rolling process, the solid solution state of B is maintained by controlling a time during which the hot rolled steel sheet is retained in a temperature range of 600° C. to 700° C. to be 10 seconds or less and by performing coiling at a temperature of lower than 600° C. In the annealing process, an austenite phase, that is, a martensite phase in the final microstructure is refined by performing heating at a heating rate of 15° C. or less and by holding the heated steel sheet at a temperature of 750° C. to 950° C. In the subsequent cooling process, it is possible to maintain fine crystal grains through the use of solid solute B and by performing cooling at a cooling rate of 3° C./s or more in order to inhibit the formation of a ferrite phase, and it is possible to homogenize the hardness of a martensite phase by performing cooling at a cooling rate of 100° C./s or more in a temperature range equal to or lower than the Ms temperature, resulting in excellent bendability and appearance quality after bending has been performed. The details will be described hereafter.

3-1) Hot Rolling Process

Total Retention Time in Temperature Range of 600° C. to 700° C.: 10 Seconds or Less After finish rolling has been performed, in the case where the retention time of a steel sheet in a temperature range of 600° C. to 700° C. is more than 10 seconds, since compounds containing B such as B carbides are formed, there is a decrease in the effect of B when annealing is performed, that is, the effect of decreasing the area ratio of a bainite phase in a microstructure, due to a decrease in the amount of solid solute B in steel, which makes it impossible to form the steel sheet microstructure according to embodiments of the present invention. Therefore, the total retention time in a temperature range of 600° C. to 700° C. is set to be 10 seconds or less, or preferably 8 seconds or less. Here, the temperature refers to the temperature of the surface of a steel sheet.

Coiling Temperature: Lower than 600° C.

In the case where the coiling temperature is 600° C. or higher, since compounds containing B such as B carbides are formed, there is a decrease in the effect of B when annealing is performed due to a decrease in the amount of solid solute B in steel, which makes it impossible to form the steel sheet microstructure according to embodiments of the present invention. Therefore, the coiling temperature is set to be lower than 600° C. Although there is no particular limitation on the lower limit of the coiling temperature, it is preferable that the coiling temperature be about 400° C. or higher from the viewpoint of temperature controllability.

Although it is preferable that a slab is manufactured by using a continuous casting method in order to prevent macro segregation, a slab may be manufactured by using an ingot-making method or a thin-slab-casting method. When a slab is subjected to hot rolling, hot rolling may be performed after the slab has been first cooled to room temperature and then reheated, or hot rolling may be performed after the slab has been charged into a heating furnace without having been cooled to room temperature. Alternatively, an energy-saving process, in which hot rolling is performed immediately after heat retention has been performed for a short time, may be used. In the case where a slab is heated, it is preferable that the slab be heated to a temperature of 1100° C. or higher in order to dissolve carbides and in order to prevent an increase in rolling load. In addition, it is preferable that the heating temperature of a slab be 1300° C. or lower in order to prevent an increase in the amount of scale loss. Here, the temperature of a slab refers to the temperature of the surface of the slab.

When a slab is subjected to hot rolling, a sheet bar, which has been subjected to rough rolling, may be heated in view of preventing troubles from occurring when rolling is performed even in the case where the slab heating temperature is low. In addition, a so-called continuous rolling process, in which sheet bars are joined in order to continuously perform finish rolling, may be used. In the case where finish rolling is finished at a temperature of lower than the $Ar_3$ transformation temperature, since there is an increase in anisotropy, there may be a decrease in workability after cold rolling or annealing has been performed. Therefore, it is preferable that finish rolling be finished at a temperature equal to or higher than the $Ar_3$ transformation temperature. In addition, in order to decrease rolling load and in order to homogenize a shape and properties, it is preferable that lubrication rolling be performed so that a frictional coefficient is 0.10 to 0.25 in the all or part of the finish rolling passes.

In addition, usually, the coiled steel sheet is subjected to, for example, cold rolling, annealing, and galvanizing after scale has been removed by performing, for example, pickling.

3-2) Cold Rolling Process

Rolling Reduction of Cold Rolling: More than 20%

In the case where the rolling reduction is 20% or less, since recrystallization does not occur when annealing is performed, an elongated microstructure is retained, which makes it impossible to form the steel sheet microstructure according to embodiments of the present invention. Therefore, the rolling reduction of cold rolling is set to be more than 20%, or preferably 30% or more. Here, Although there is no particular limitation on the upper limit of the rolling reduction, it is preferable that the rolling reduction be about 90% or less from the viewpoint of, for example, shape stability.

3-3) Annealing Process

Heating at Average Heating Rate to Annealing Temperature: 15° C./s or Less to a Temperature of 750° C. to 950° C.

In the case where the average heating rate is more than 15° C./s, since there is an increase in grain growth due to reverse transformation rapidly progressing from a non-recrystallized microstructure, in which large rolling strain is accumulated, a coarse austenite phase, that is, a coarse martensite phase in the final microstructure tends to be formed, which makes it impossible to form the steel sheet microstructure according to embodiments of the present invention. Therefore, the average heating rate is set to be 15° C./s or less, or preferably 8° C./s or less. Although there is no particular limitation on the lower limit of the average heating rate, since there is a case where coarse crystal grains are formed in the case where the average heating rate is less than 1° C./s, it is preferable that the average heating rate be 1° C./s or more. Here, the term "an average heating rate" refers to a value calculated by dividing the deference between a heating start temperature of a steel sheet and the annealing temperature of the steel sheet by the time required for heating. In the present invention, "s" used when representing the unit of a heating rate or a cooling rate refers to "second".

In the case where heating is performed to a temperature of lower than 750° C., since the amount of an austenite phase, that is, a martensite phase in the final microstructure is insufficiently formed, it is not possible to form the steel sheet microstructure according to embodiments of the present invention. On the other hand, in the case where heating is performed to a temperature of higher than 950° C., since there is an increase in the diameter of austenite grains, it is not possible to form the steel sheet microstructure according to embodiments of the present invention. Therefore, the annealing temperature is set to be 750° C. to 950° C.

Holding Time at Annealing Temperature: 30 Seconds or More

In the case where the holding time at an annealing temperature of 750° C. to 950° C. is less than 30 seconds, since the amount of an austenite phase formed is insufficient, it is not possible to form the steel sheet microstructure according to embodiments of the present invention. Therefore, the holding time at the annealing temperature is set to be 30 seconds or more. Although there is no particular limitation on the upper limit of the holding time, it is preferable that the holding time be about 1000 seconds or less from the viewpoint of, for example, productivity.

3-4) First Cooling Process (Cooling Process from End of Annealing to Dipping in Galvanizing Bath)

Average Cooling Rate: 3° C./s or More

In the case where the average cooling rate after the annealing process is less than 3° C./s, since excessive amounts of ferrite phase and upper bainite phase are formed during cooling and holding, it is not possible to form the steel sheet microstructure according to embodiments of the present invention. Therefore, the average cooling rate is set to be 3° C./s or more, or preferably 5° C./s or more. On the other hand, it is preferable that the upper limit of the average cooling rate be 50° C./s or less, or more preferably 40° C./s or less. This average cooling rate refers to a value obtained by dividing the difference between the annealing temperature of a steel sheet and the temperature of the galvanizing bath by the time from the end of annealing to dipping in galvanizing bath. Here, as long as the condition described above regarding the cooling rate is satisfied, for example, cooling, heating, or holding may be performed in a temperature range from the Ms temperature to 550° C. during the cooling process.

3-5) Galvanizing Process

Galvanizing is performed on the steel sheet which has been cooled from the annealing temperature through the first cooling process. There is no particular limitation on the conditions used for a galvanizing treatment. For example, it is preferable that a galvanizing treatment be performed by dipping the steel sheet which has been subjected to the treatment described above in a galvanizing bath having a temperature of 440° C. or higher and 500° C. or lower and by then performing, for example, gas wiping in order to control coating weight. It is preferable that a galvanizing bath having an Al content of 0.08 mass % to 0.25 mass % be used in a galvanizing treatment. Further, in the case where an alloying treatment is performed on the galvanizing layer, it is preferable that an alloying treatment be performed by holding the steel sheet in a temperature range of 460° C. or higher and 600° C. or less for 1 second or more and 40 seconds or less.

3-6) Second Cooling Process (Cooling Process after Galvanizing has been Performed)

Cooling at Average Cooling Rate: 1° C./s or More to Temperature Equal to or Higher than Ms Temperature Slow cooling is performed at an average cooling rate of 1° C./s or more in a temperature range not lower than the Ms temperature. In the case where the average cooling rate is less than 1° C./s in this slow cooling, since an upper bainite phase and a lower bainite phase are formed during cooling, it is not possible to form the steel sheet microstructure according to embodiments of the present invention. Therefore, the average cooling rate of this slow cooling is set to be 1° C./s or more. This average cooling rate refers to a value obtained by dividing the difference between the temperature of the steel sheet after galvanizing has been performed and the temperature of the steel sheet when the cooling is stopped by the time required for the cooling. In the case where the cooling rate of slow cooling is excessively large, since a variation in temperature tend to occur, there may be a variation in hardness. Therefore, it is preferable that the average cooling rate be 50° C./s or less.

Cooling Stop Temperature: Equal to or Higher than Ms Temperature

In the case where the cooling stop temperature of slow cooling is lower than the Ms temperature, since an auto-tempered martensite phase and a lower bainite phase are formed, it is not possible to form the steel sheet microstructure according to embodiments of the present invention. Therefore, the cooling stop temperature of slow cooling is set to be equal to or higher than the Ms temperature, or preferably the Ms temperature to 500° C. In certain embodiments of the present invention, the Ms temperature is determined from the change in linear expansion.

Cooling at Average Cooling Rate: 100° C./s or More to a Temperature of 100° C. or Lower After the slow cooling has been performed, rapid cooling is performed at an average cooling rate of 100° C./s or more to a temperature of 100° C. or lower. In the case where the average cooling rate to a temperature of 100° C. or lower is less than 100° C./s, since an auto-tempered martensite phase and a lower bainite phase are formed, it is not possible to form the steel sheet microstructure according to embodiments of the present invention. Therefore, the average cooling rate to a temperature of 100° C. or lower is set to be 100° C./s or more. This average cooling rate refers to a value obtained by dividing the difference between the temperature of the steel sheet after the slow cooling described above has been performed and the temperature of the steel sheet when the second cooling is stopped by the time required for the cooling.

Second Cooling Stop Temperature: 100° C. or Lower

In the case where the second cooling stop temperature is higher than 100° C., since an auto-tempered martensite phase and a lower bainite phase are formed, it is not possible to form the steel sheet microstructure according to embodiments of the present invention. Therefore, the rapid cooling stop temperature is set to be 100° C. or lower.

3-7) Other Processes

The high-strength galvanized steel sheet according to embodiments of the present invention may also be subjected to various coating treatments such as resin coating and oil-and-fat coating. In addition, a steel sheet whose galvanizing layer has been subjected to an alloying treatment may be subjected to skin pass rolling, for example, in order to perform shape correction and in order to control surface roughness.

4) Other Conditions and so Forth

Although there is no particular limitation on the thickness of the high-strength galvanized steel sheet according to embodiments of the present invention, it is preferable that the thickness of the steel sheet be 0.4 mm to 3.0 mm. In addition, although the TS of the high-strength galvanized steel sheet according to embodiments of the present invention is 980 MPa or more, it is preferable that the TS of the steel sheet be 1180 MPa or more.

There is no particular limitation on the use of the high-strength galvanized steel sheet according to embodiments of the present invention. Since the steel sheet can contribute to a decrease in the weight of an automobile and increase in the quality of an automobile body, it is preferable that the steel sheet be used for automobile parts.

Examples

Hereafter, examples of embodiments of the present invention will be described. The technical scope of the present invention is not limited to the examples described below.

By using steels having the chemical compositions given in Table 1 (the balance being Fe and inevitable impurities), galvanized steel sheets were manufactured under the conditions given in Table 2. In detail, molten steels having the chemical compositions given in Table 1 were prepared by using a vacuum melting furnace and rolled into steel slabs. These steel slabs were heated to a temperature of 1200° C. and then subjected to rough rolling, finish rolling, cooling, and coiling to obtain hot-rolled steel sheets. Subsequently, the hot-rolled steel sheets were subjected to cold rolling to a thickness of 1.4 mm to obtain cold-rolled steel sheets and then subjected to annealing. By performing annealing by using an infrared image furnace, which simulated a continuous galvanizing line, under the conditions given in Table 2, galvanized steel sheets (GI) and galvannealed steel sheets (GA) (steel sheet Nos. 1 through 31) were manufactured. The galvanized steel sheets were manufactured by dipping the steel sheets in a galvanizing bath having a temperature of 460° C. to form galvanizing layers having a coating weight of 35 g/m² to 45 g/m². The galvannealed steel sheets were manufactured by forming galvanizing layers through the process described above and by then performing an alloying treatment in a temperature range of 460° C. to 600° C. Hereafter, the GI and the GA shall be referred to as "galvanized steel sheets".

After having performed skin pass rolling on the obtained galvanized steel sheets with an elongation ratio of 0.2%, tensile properties and bending workability were determined by using the methods described below. In addition, by using the methods described above, steel sheet microstructure and the standard deviation of a variation in the Vickers hardness of a martensite phase were investigated. The results are given in Table 3. Here, the Vickers hardness of a martensite phase determined in each of the examples of the present invention was within a range of 300 to 600.

<Tensile Property Test>

By performing a tensile test with a strain rate of $10^{-3}$/s in accordance with JIS Z 2241 on a JIS No. 5 tensile test piece (JIS Z 2201) which had been taken from the obtained galvanized steel sheet along a direction at a right angle to the rolling direction, TS was determined. A case where the TS was 980 MPa or more was judged as satisfactory, and a case where the TS was 1180 MPa or more was judged as more than satisfactory.

<Bending Workability Test>

A bending test was performed on a strip-shaped test piece having a width of 35 mm and a length of 100 mm which had been taken from the obtained galvanized steel sheet so that the direction of the flection axis was parallel to the rolling direction. By performing a V-bend test at an angle of 90° under the conditions of a stroke speed of 10 mm/s, a press load of 10 ton, a press-holding time of 5 seconds, and a bending radius R of 2.0 mm, and by observing the ridge line at the bending position by using a loupe at a magnification of 10 times, cracking and streaky undulation were respectively evaluated on a 5-point scale, and a case of rank 3 or higher was judged as satisfactory. In addition, in the case of rank 3 or higher, the higher the rank, the better the evaluation was.

In the evaluation of cracking, a case where a crack of 5 mm or more was observed was ranked as "1", a case where a crack of 1 mm or more and less than 5 mm was observed was ranked as "2", a case where a crack of 0.5 mm or more and less than 1 mm was observed was ranked as "3", a case where a crack of 0.2 mm or more and less than 0.5 mm was observed was ranked as "4", and a case where a crack of less than 0.2 mm or no crack was observed was ranked as "5".

In the evaluation of streaky undulation, a case where streaky undulation was markedly observed was ranked as "1", a case where streaky undulation was ordinarily observed was ranked as "2", a case where streaky undulation was slightly observed was ranked as "3", a case where streaky undulation was very slightly observed was ranked as "4", and a case where no streaky undulation was observed was ranked as "5".

TABLE 1

| | Chemical Composition (mass %) | | | | | | | | | | | |
|---|---|---|---|---|---|---|---|---|---|---|---|---|
| Steel | C | Si | Mn | P | S | Al | N | Ti | B | Ti − 4N | Other | Note |
| A | 0.12 | 0.55 | 2.9 | 0.015 | 0.003 | 0.033 | 0.004 | 0.018 | 0.0018 | 0.002 | — | within Scope of Invention |
| B | 0.15 | 0.02 | 3.1 | 0.009 | 0.002 | 0.028 | 0.003 | 0.020 | 0.0007 | 0.008 | — | within Scope of Invention |
| C | 0.22 | 0.04 | 2.3 | 0.011 | 0.005 | 0.019 | 0.003 | 0.014 | 0.0010 | 0.002 | — | within Scope of Invention |
| D | 0.08 | 0.27 | 2.5 | 0.023 | 0.002 | 0.025 | 0.001 | 0.019 | 0.0032 | 0.015 | Cr: 0.50, Nb: 0.030 | within Scope of Invention |
| E | 0.13 | 0.12 | 1.9 | 0.016 | 0.001 | 0.033 | 0.002 | 0.021 | 0.0021 | 0.013 | Cr: 1.20, Mo: 0.20 | within Scope of Invention |
| F | 0.16 | 0.01 | 2.8 | 0.003 | 0.005 | 0.036 | 0.003 | 0.020 | 0.0018 | 0.008 | V: 0.10 | within Scope of Invention |
| G | 0.11 | 0.31 | 3.0 | 0.007 | 0.003 | 0.039 | 0.004 | 0.018 | 0.0009 | 0.002 | Ni: 0.10 | within Scope of Invention |
| H | 0.21 | 0.15 | 2.5 | 0.006 | 0.003 | 0.029 | 0.004 | 0.019 | 0.0010 | 0.003 | Cu: 0.11 | within Scope of Invention |
| I | 0.18 | 0.02 | 2.7 | 0.012 | 0.002 | 0.031 | 0.005 | 0.021 | 0.0015 | 0.001 | Ca: 0.001 | within Scope of Invention |
| J | 0.12 | 0.44 | 2.8 | 0.015 | 0.001 | 0.047 | 0.001 | 0.011 | 0.0011 | 0.007 | REM: 0.002 | within Scope of Invention |
| K | 0.05 | 0.25 | 2.6 | 0.016 | 0.003 | 0.013 | 0.003 | 0.021 | 0.0015 | 0.009 | — | out of Scope of Invention |
| L | 0.26 | 0.02 | 2.8 | 0.015 | 0.003 | 0.032 | 0.002 | 0.020 | 0.0009 | 0.012 | — | out of Scope of Invention |
| M | 0.18 | 3.35 | 3.4 | 0.009 | 0.002 | 0.039 | 0.003 | 0.016 | 0.0014 | 0.004 | — | out of Scope of Invention |
| N | 0.18 | 0.04 | 1.4 | 0.011 | 0.001 | 0.009 | 0.003 | 0.018 | 0.0016 | 0.006 | — | out of Scope of Invention |
| O | 0.19 | 0.11 | 2.5 | 0.012 | 0.003 | 0.024 | 0.004 | 0.001 | 0.0015 | −0.015 | — | out of Scope of Invention |
| P | 0.15 | 0.02 | 2.6 | 0.007 | 0.001 | 0.035 | 0.003 | 0.019 | 0.0002 | 0.007 | — | out of Scope of Invention |
| Q | 0.14 | 0.03 | 2.7 | 0.011 | 0.001 | 0.030 | 0.005 | 0.008 | 0.0010 | −0.012 | — | out of Scope of Invention |
| R | 0.13 | 0.30 | 2.6 | 0.012 | 0.002 | 0.033 | 0.003 | 0.015 | 0.0074 | 0.003 | — | out of Scope of Invention |
| S | 0.11 | 0.25 | 4.3 | 0.010 | 0.001 | 0.030 | 0.003 | 0.019 | 0.0016 | 0.007 | — | out of Scope of Invention |
| T | 0.11 | 0.25 | 3.5 | 0.012 | 0.002 | 0.025 | 0.003 | 0.017 | 0.0012 | 0.005 | — | within Scope of Invention |

TABLE 2

| Steel Sheet No. | Steel | Hot Rolling Condition Retention Time at 600° C. to 700° C. (sec) | Hot Rolling Condition Coiling Temperature (° C.) | Cold Rolling Condition Rolling Reduction (%) | Annealing Condition Average Heating Rate (° C./s) | Annealing Condition Annealing Temperature (° C.) | Annealing Condition Annealing Holding Time (sec) | First Cooling Condition Average Cooling Rate (° C./s) | Alloying Condition Alloying Treatment Temperature (° C.) | Alloying Condition Holding Time (sec) |
|---|---|---|---|---|---|---|---|---|---|---|
| 1 | A | 5 | 550 | 50 | 5 | 850 | 150 | 6 | — | — |
| 2 |   | 5 | 550 | 50 | 5 | 740 | 150 | 6 | — | — |
| 3 |   | 5 | 550 | 50 | 5 | 850 | 150 | 6 | — | — |
| 4 |   | 5 | 550 | 50 | 5 | 980 | 150 | 6 | — | — |
| 5 | B | 6 | 550 | 50 | 2 | 780 | 500 | 8 | 500 | 15 |
| 6 |   | 6 | 550 | 50 | 2 | 780 | 10 | 8 | 510 | 15 |
| 7 |   | 6 | 550 | 50 | 2 | 780 | 500 | 8 | 510 | 15 |
| 8 |   | 6 | 550 | 50 | 2 | 780 | 500 | 8 | 510 | 15 |
| 9 | C | 2 | 500 | 50 | 3 | 900 | 300 | 20 | 500 | 20 |
| 10 |   | 2 | 500 | 50 | 17 | 900 | 300 | 20 | 500 | 20 |
| 11 |   | 2 | 500 | 50 | 3 | 900 | 300 | 20 | 500 | 20 |
| 12 | D | 1 | 450 | 50 | 4 | 830 | 120 | 6 | — | — |
| 13 |   | 12 | 650 | 50 | 4 | 830 | 120 | 30 | — | — |
| 14 | E | 5 | 550 | 50 | 4 | 850 | 300 | 30 | 510 | 20 |
| 15 |   | 5 | 550 | 50 | 4 | 850 | 300 | 1 | 510 | 20 |
| 16 | F | 1 | 500 | 50 | 4 | 850 | 180 | 5 | 500 | 15 |
| 17 |   | 1 | 500 | 50 | 4 | 850 | 180 | 5 | 500 | 15 |
| 18 | G | 2 | 500 | 50 | 4 | 850 | 100 | 5 | 520 | 20 |
| 19 | H | 2 | 500 | 50 | 4 | 850 | 300 | 10 | 510 | 15 |
| 20 | I | 2 | 500 | 50 | 4 | 850 | 300 | 10 | 490 | 30 |
| 21 | J | 2 | 500 | 50 | 4 | 850 | 300 | 10 | 530 | 15 |
| 22 | K | 2 | 500 | 50 | 4 | 850 | 300 | 10 | 510 | 15 |
| 23 | L | 1 | 500 | 50 | 4 | 850 | 300 | 10 | 500 | 15 |
| 24 | M | 1 | 500 | 50 | 4 | 850 | 300 | 10 | 580 | 25 |
| 25 | N | 2 | 500 | 50 | 4 | 850 | 300 | 10 | 500 | 15 |
| 26 | O | 2 | 500 | 50 | 4 | 850 | 300 | 10 | 500 | 20 |
| 27 | P | 2 | 500 | 50 | 4 | 850 | 300 | 10 | 500 | 20 |
| 28 | Q | 2 | 500 | 50 | 4 | 850 | 300 | 10 | 500 | 20 |
| 29 | R | 2 | 500 | 50 | 4 | 850 | 300 | 10 | 510 | 20 |
| 30 | S | 2 | 500 | 50 | 4 | 850 | 300 | 10 | 510 | 20 |
| 31 | T | 2 | 500 | 50 | 4 | 850 | 300 | 10 | 510 | 20 |

| Steel Sheet No. | Second Cooling Condition Slow Cooling Rate (° C./s) | Second Cooling Condition Slow Cooling Stop Temperature (° C.) | Second Cooling Condition Rapid Cooling Rate (° C./s) | Second Cooling Condition Rapid Cooling Stop Temperature (° C.) | *Galvanizing Condition | Ms Temperature at End of Slow Cooling (° C.) | Note |
|---|---|---|---|---|---|---|---|
| 1 | 5 | 440 | 200 | 50 | GI | 386 | Example |
| 2 | 5 | 440 | 200 | 50 | GI | 211 | Comparative Example |
| 3 | 5 | 440 | 200 | 300 | GI | 386 | Comparative Example |
| 4 | 5 | 440 | 200 | 50 | GI | 386 | Comparative Example |
| 5 | 3 | 370 | 500 | 50 | GA | 358 | Example |
| 6 | 3 | 370 | 500 | 50 | GA | 335 | Comparative Example |
| 7 | 3 | 300 | 500 | 50 | GA | 355 | Comparative Example |
| 8 | 3 | 370 | 50 | 50 | GA | 355 | Comparative Example |
| 9 | 50 | 400 | 500 | 50 | GA | 381 | Example |
| 10 | 50 | 400 | 500 | 50 | GA | 381 | Comparative Example |
| 11 | 50 | 400 | 500 | 220 | GA | 381 | Comparative Example |
| 12 | 10 | 450 | 500 | 50 | GI | 409 | Example |
| 13 | 10 | 450 | 500 | 50 | GI | 388 | Comparative Example |
| 14 | 2 | 500 | 500 | 50 | GA | 403 | Example |
| 15 | 2 | 500 | 500 | 50 | GA | 298 | Comparative Example |
| 16 | 10 | 400 | 500 | 50 | GA | 382 | Example |
| 17 | 0.1 | 400 | 500 | 50 | GA | 368 | Comparative Example |
| 18 | 10 | 400 | 500 | 50 | GA | 388 | Example |
| 19 | 5 | 400 | 500 | 50 | GA | 375 | Example |
| 20 | 5 | 400 | 500 | 50 | GA | 379 | Example |
| 21 | 5 | 520 | 500 | 50 | GA | 391 | Example |
| 22 | 5 | 450 | 500 | 50 | GA | 394 | Comparative Example |
| 23 | 5 | 450 | 500 | 50 | GA | 347 | Comparative Example |
| 24 | 5 | 450 | 500 | 50 | GA | 314 | Comparative Example |
| 25 | 5 | 450 | 500 | 50 | GA | 375 | Comparative Example |
| 26 | 5 | 450 | 500 | 50 | GA | 337 | Comparative Example |
| 27 | 5 | 450 | 500 | 50 | GA | 355 | Comparative Example |
| 28 | 5 | 450 | 500 | 50 | GA | 364 | Comparative Example |

TABLE 2-continued

| | | | | | | | | |
|---|---|---|---|---|---|---|---|---|
| 29 | 5 | 450 | 500 | 50 | GA | | 365 | Comparative Example |
| 30 | 5 | 450 | 500 | 50 | GA | | 338 | Comparative Example |
| 31 | 5 | 450 | 500 | 50 | GA | | 367 | Example |

*Galvanizing Condition: GI: galvanized steel sheet, GA: galvannealed steel sheet

TABLE 3

| Steel Sheet No. | *Steel Sheet Microstructure | | | | | | | | **Mechanical Property | | Bending Workability | | Note |
|---|---|---|---|---|---|---|---|---|---|---|---|---|---|
| | V (F) (%) | V (M) (%) | V (ATM) (%) | V (UB) (%) | V (LB) (%) | V (γ) (%) | Other (%) | d (M) (μm) | Standard Deviation of Hardness of Martensile Phase σ | TS (MPa) | Cracking | Streaky Undulation | |
| 1 | 0 | 97 | 0 | 3 | 0 | 0 | 0 | 12 | 8 | 1315 | 5 | 4 | Example |
| 2 | 77 | 18 | 0 | 0 | 0 | 5 | 0 | 1 | — | 881 | 4 | 3 | Comparative Example |
| 3 | 0 | 2 | 76 | 0 | 21 | 1 | 0 | 11 | 21 | 1208 | 3 | 2 | Comparative Example |
| 4 | 0 | 99 | 0 | 1 | 0 | 0 | 0 | 32 | 7 | 1319 | 2 | 5 | Comparative Example |
| 5 | 3 | 89 | 0 | 8 | 0 | 0 | 0 | 6 | 9 | 1438 | 5 | 5 | Example |
| 6 | 20 | 54 | 0 | 22 | 0 | 4 | 0 | 4 | 11 | 1304 | 1 | 4 | Comparative Example |
| 7 | 4 | 3 | 71 | 0 | 22 | 0 | 0 | 6 | 25 | 1325 | 1 | 1 | Comparative Example |
| 8 | 4 | 2 | 65 | 0 | 29 | 0 | 0 | 6 | 26 | 1352 | 1 | 1 | Comparative Example |
| 9 | 0 | 100 | 0 | 0 | 0 | 0 | 0 | 14 | 13 | 1855 | 4 | 5 | Example |
| 10 | 0 | 100 | 0 | 0 | 0 | 0 | 0 | 21 | 15 | 1829 | 2 | 4 | Comparative Example |
| 11 | 0 | 6 | 83 | 0 | 10 | 1 | 0 | 17 | 23 | 1666 | 2 | 1 | Comparative Example |
| 12 | 3 | 82 | 0 | 15 | 0 | 0 | 0 | 5 | 10 | 1197 | 5 | 5 | Example |
| 13 | 39 | 58 | 0 | 3 | 0 | 0 | 0 | 4 | 22 | 1084 | 4 | 2 | Comparative Example |
| 14 | 0 | 100 | 0 | 0 | 0 | 0 | 0 | 7 | 6 | 1343 | 5 | 5 | Example |
| 15 | 41 | 30 | 0 | 28 | 0 | 1 | 0 | 1 | — | 1020 | 2 | 3 | Comparative Example |
| 16 | 0 | 98 | 0 | 2 | 0 | 0 | 0 | 6 | 9 | 1488 | 5 | 5 | Example |
| 17 | 0 | 57 | 0 | 43 | 0 | 0 | 0 | 6 | 13 | 1469 | 1 | 3 | Comparative Example |
| 18 | 0 | 100 | 0 | 0 | 0 | 0 | 0 | 10 | 8 | 1265 | 5 | 5 | Example |
| 19 | 0 | 99 | 0 | 0 | 0 | 1 | 0 | 9 | 15 | 1754 | 4 | 4 | Example |
| 20 | 0 | 100 | 0 | 0 | 0 | 0 | 0 | 10 | 11 | 1692 | 5 | 5 | Example |
| 21 | 0 | 100 | 0 | 0 | 0 | 0 | 0 | 11 | 10 | 1303 | 5 | 5 | Example |
| 22 | 11 | 23 | 0 | 63 | 0 | 3 | 0 | 1 | — | 713 | 4 | 4 | Comparative Example |
| 23 | 0 | 99 | 0 | 0 | 0 | 1 | 0 | 10 | 19 | 2037 | 1 | 3 | Comparative Example |
| 24 | 0 | 99 | 0 | 0 | 0 | 1 | 0 | 9 | 15 | 1705 | 2 | 4 | Comparative Example |
| 25 | 16 | 39 | 0 | 45 | 0 | 0 | 0 | 5 | 18 | 1043 | 2 | 4 | Comparative Example |
| 26 | 7 | 53 | 0 | 40 | 0 | 0 | 0 | 6 | 18 | 1272 | 2 | 4 | Comparative Example |
| 27 | 14 | 48 | 0 | 38 | 0 | 0 | 0 | 5 | 15 | 1212 | 2 | 3 | Comparative Example |
| 28 | 12 | 53 | 0 | 35 | 0 | 0 | 0 | 5 | 14 | 1207 | 2 | 3 | Comparative Example |
| 29 | 0 | 99 | 0 | 1 | 0 | 0 | 0 | 11 | 10 | 1360 | 2 | 4 | Comparative Example |
| 30 | 0 | 99 | 0 | 1 | 0 | 0 | 0 | 10 | 9 | 1322 | 2 | 4 | Comparative Example |
| 31 | 0 | 99 | 0 | 1 | 0 | 0 | 0 | 11 | 9 | 1310 | 3 | 4 | Example |

*V(F): the area ratio of ferrite, V(M): the area ratio of martensite, V(ATM): the area ratio of auto-tempered martensite, V(UB): the area ratio of upper bainite, V(LB): the area ratio of lower bainite, V(γ): the volume fraction of retained austenite, Other: the area ratio of phases other than those above, d(M): the average crystal grain diameter of martensite
**The sign "—" for the standard deviation of the hardness of martensite indicates that the standard deviation could not be determined due to a very small grain diameter.

It is clarified that, in the case of the examples of the present invention, it is possible to achieve a TS of 980 MPa or more, in particular, 1180 MPa or more while achieving excellent bending workability. Therefore, according to the examples of the present invention, it is possible to obtain a high-strength galvanized steel sheet excellent in terms of bending workability. The steel sheet contributes to the weight reduction of an automobile and significantly contributes to an increase in the quality of an automobile body, and thus excellent effects can be achieved.

According to embodiments of the present invention, it is possible to obtain a high-strength galvanized steel sheet having a TS of 980 MPa or more, in particular, 1180 MPa or more while achieving excellent bending workability. By using the high-strength galvanized steel sheet according to embodiments of the present invention for automobile parts, it is possible to contribute to the weight reduction of an automobile and to significantly contribute to an increase in the quality of an automobile body.

The invention claimed is:
1. A high-strength, galvanized steel sheet having a chemical composition containing, by mass %:
C: 0.07% to 0.25%,
Si: 0.01% to 3.00%,
Mn: 1.5% to 4.0%,
P: 0.100% or less,
S: 0.02% or less,
Al: 0.01% to 1.50%,
N: 0.001% to 0.008%,
Ti: 0.003% to 0.200%,
B: 0.0003% to 0.0050%,
and the balance being Fe and inevitable impurities,
wherein
the relationship Ti>4N is satisfied, and
a microstructure including, in terms of area ratio in a cross section located at ¼ of the thickness from the surface of a base steel sheet:
a ferrite phase in an amount of 70% or less (including 0%),
a bainite phase in an amount of 20% or less (including 0%), a martensite phase in an amount of 25% or more, and a retained austenite phase in an amount of less than 3% (including 0%), wherein the average crystal grain diameter of the martensite phase is 20 µm or less, and wherein a variation in the Vickers hardness of the martensite phase is 20 or less in terms of standard deviation, wherein the Vickers hardness is measured with a load of 20 g.

2. A method for manufacturing a high-strength, galvanized steel sheet, according to claim 1 the method comprising performing the following processes in the following order:

a hot rolling process in which, after having performed finish rolling on a slab having the chemical composition, cooling is performed such that a total time during which the hot-rolled steel sheet is retained in a temperature range of 600° C. to 700° C. is 10 seconds or less and in which coiling is performed at a coiling temperature of lower than 600° C., a cold rolling process in which cold rolling is performed with a rolling reduction of more than 20%, an annealing process in which heating is performed to an annealing temperature of 750° C. to 950° C. at an average heating rate of 15° C./s or less and in which the heated steel sheet is held at the annealing temperature for 30 seconds or more, a first cooling process in which cooling is performed at an average cooling rate of 3° C./s or more, a galvanizing process in which galvanizing is performed, and a second cooling process in which, after having performed cooling to a temperature equal to or higher than the Ms temperature at an average cooling rate of 1° C./s or more, cooling is performed to a temperature of 100° C. or lower at an average cooling rate of 100° C./s or more.

3. The method for manufacturing a high-strength, galvanized steel sheet according to claim 2, wherein, after having performed galvanizing in the galvanizing process, an alloying treatment is further performed on the galvanizing layer by heating the galvanized steel sheet to a temperature of 460° C. to 600° C.

4. The high-strength, galvanized steel sheet according to claim 1, the chemical composition further containing, by mass %, at least one group selected from the group consisting of Group A to C:

Group A, which contains at least one selected from:
Cr: 0.01% to 2.00%,
Mo: 0.01% to 2.00%,
V: 0.01% to 2.00%,
Ni: 0.01% to 2.00%, and
Cu: 0.01% to 2.00%;

Group B, which contains:
Nb: 0.003% to 0.200%; and

Group C, which contains at least one selected from:
Ca: 0.001% to 0.005%, and
REM: 0.001% to 0.005%.

5. A method for manufacturing a high-strength, galvanized steel sheet, according to claim 4 the method comprising performing the following processes in the following order:

a hot rolling process in which, after having performed finish rolling on a slab having the chemical composition, cooling is performed such that a total time during which the hot-rolled steel sheet is retained in a temperature range of 600° C. to 700° C. is 10 seconds or less and in which coiling is performed at a coiling temperature of lower than 600° C., a cold rolling process in which cold rolling is performed with a rolling reduction of more than 20%, an annealing process in which heating is performed to an annealing temperature of 750° C. to 950° C. at an average heating rate of 15° C./s or less and in which the heated steel sheet is held at the annealing temperature for 30 seconds or more, a first cooling process in which cooling is performed at an average cooling rate of 3° C./s or more, a galvanizing process in which galvanizing is performed, and a second cooling process in which, after having performed cooling to a temperature equal to or higher than the Ms temperature at an average cooling rate of 1° C./s or more, cooling is performed to a temperature of 100° C. or lower at an average cooling rate of 100° C./s or more.

6. The method for manufacturing a high-strength, galvanized steel sheet according to claim 5, wherein, after having performed galvanizing in the galvanizing process, an alloying treatment is further performed on the galvanizing layer by heating the galvanized steel sheet to a temperature of 460° C. to 600° C.

* * * * *